(12) United States Patent
Shibata et al.

(10) Patent No.: US 6,358,644 B1
(45) Date of Patent: Mar. 19, 2002

(54) NON-AQUEOUS ELECTOLYTE CELL (75) Inventors: Keiichi Shibata; Kyoko Obata; Kazuhito Hatsuta, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/422,253

(22) Filed: Oct. 21, 1999

(30) Foreign Application Priority Data

Oct. 30, 1998 (JP) .......................................... 10-311481

(51) Int. Cl.⁷ .............................. H01M 2/02; H01M 6/14
(52) U.S. Cl. ...................... 429/162; 429/176; 429/177; 429/178
(58) Field of Search ................................. 429/175, 176, 429/162, 177, 178; 206/438

(56) References Cited

U.S. PATENT DOCUMENTS 3,193,412 A * 7/1965 Salkind et al.
6,106,973 A * 8/2000 Sonozaki et al. ........... 429/162
6,242,130 B1 * 6/2001 Noh et al. .................. 429/175

FOREIGN PATENT DOCUMENTS

| EP | 0 852 404 A1 | 4/1997 |
| EP | 0 845 821 A2 | 11/1997 |
| EP | 0 862 230 A2 | 2/1998 |

OTHER PUBLICATIONS

Patent Abstracts of Japan Application No. 08296686 filed Nov. 8, 1996.

* cited by examiner

*Primary Examiner*—John S. Maples
(74) *Attorney, Agent, or Firm*—Sonnenschein, Nath & Rosenthal (57) ABSTRACT

A non-aqueous electrolyte cell is to be reduced in its projection area in a portable electronic equipment. A unit cell is housed in an exterior packaging material of a laminated film, formed with a spacing by deep drawing, and in which electrode terminal leads electrically connected to respective electrodes of the unit cell are led out to outside from the inside of the exterior packaging material. The exterior packaging material is heat-fused around the spacing formed by deep drawing, with the heat-fused portion of said exterior packaging material being folded on itself except the heat-fused portion of said exterior packaging material from which are led out said electrode terminal leads. The folded exterior packaging material is immobilized by the dielectric sheet to the exterior packaging material.

10 Claims, 6 Drawing Sheets

NON-AQUEOUS ELECTOLYTE CELL

BACKGROUND OF THE INVENTION

1. Field of the Invention

This invention relates to a non-aqueous electrolyte cell in which a unit cell is housed in an exterior packaging material comprised of a laminated film. More particularly, it relates to a non-aqueous electrolyte cell in which thermally fused portions of the exterior packaging material are collapsed.

2. Description of the Related Art

Recently, the tendency is towards cordlessness and portability of an electronic equipment, primarily exemplified by a notebook type personal computer, and small-sized lightweight portable electronic equipments, are being developed one after another. With the diversification of the electronic equipments, attempts are being made to reduce the thickness and the size of the secondary cells.

As the above-mentioned cells and the secondary cells, there is presented a polymer lithium ion secondary cell employing a high-polymer gel swollen with an electrolytic solution as the electrolyte.

Turning to the structure of the polymer lithium ion secondary cell, an active material comprised of $LiCoO_2$ and zinc is layered on a positive electrode current collector comprised of a thin sheet of aluminum to constitute a positive electrode. On a negative electrode current collector is layered an active material comprised of, for example, carbon, coke, graphite, etc, to constitute a negative electrode. There is interposed, between the negative and positive current collectors, a separator which is a thin porous film composed of polypropylene or polyethylene. A high-molecular gel electrolyte, such as polyacrylonitrile (PAN), polyethylene oxide (PEO) or polyvinylidene fluoride (PVDF), is charged between these electrodes and the separator to provide an overall sandwich structure.

The unit cell of the sandwich structure is packaged by an exterior packaging material, as a sealing vessel, comprised of a soft metal film, such as an aluminum foil, and a plastic film, such as a film of nylon, polyethylene, polypropylene or polyethylene terephthalate.

In the non-aqueous electrolyte cell, in which the unit cell is packaged by the above-described exterior packaging material, the rim portion of the exterior packaging material is hermetically sealed by heat fusion when housing the unit cell therein. This heat-fused portion of the exterior packaging material is indispensable in view of water-proofing of the non-aqueous electrolyte cell and has at least a width of 5 mm.

Thus, in the non-aqueous electrolyte cell, the size of the unit cell plus the size of the heat-fused portion of the exterior packaging material represents the overall size of the cell. Thus, in the non-aqueous electrolyte cell, it has been difficult to reduce the outer size of the cell, in particular the projection area thereof in an electronic equipment from the planar direction.

SUMMARY OF THE INVENTION

It is therefore an object of the present invention to provide a non-aqueous electrolyte cell the projection area of which in the portable size electronic equipment can be reduced.

According to the present invention, there is provided a non-aqueous electrolyte cell in which a unit cell is housed in an exterior packaging material of a laminated film, formed with a spacing by deep drawing, and in which electrode terminal leads electrically connected to respective electrodes of the unit cell are led out to outside from the inside of the exterior packaging material, wherein the exterior packaging material is heat-fused around the spacing formed by deep drawing, with the heat-fused portion of the exterior packaging material being folded on itself except the heat-fused portion of the exterior packaging material from which are led out the electrode terminal leads.

With the non-aqueous electrolyte cell of the present invention, the folded portion of the exterior packaging material is immobilized by an adhesive transfer tape.

With the non-aqueous electrolyte cell of the present invention, the heat-fused exterior packaging material is folded on itself to reduce the size of the cell as seen from the planar side of the cell.

Also, with the non-aqueous electrolyte cell of the present invention, in which the folded exterior packaging material is immobilized with an adhesive transfer tape, it is possible to maintain the reduced outer size over protracted time.

DESCRIPTION OF THE PREFERRED EMBODIMENTS

Referring to the drawings, preferred embodiments of a non-aqueous electrolyte cell according to the present invention will be explained in detail.

Figure 1:
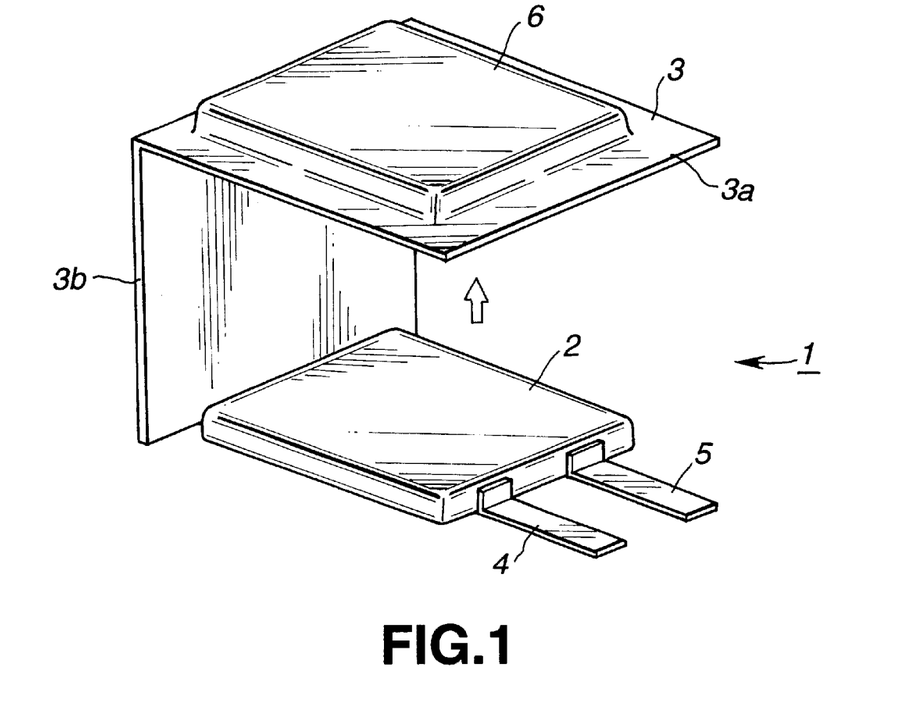
FIG. 1 is a perspective view showing a unit cell about to be inserted into the inside of an exterior packaging material.
Figure 2:
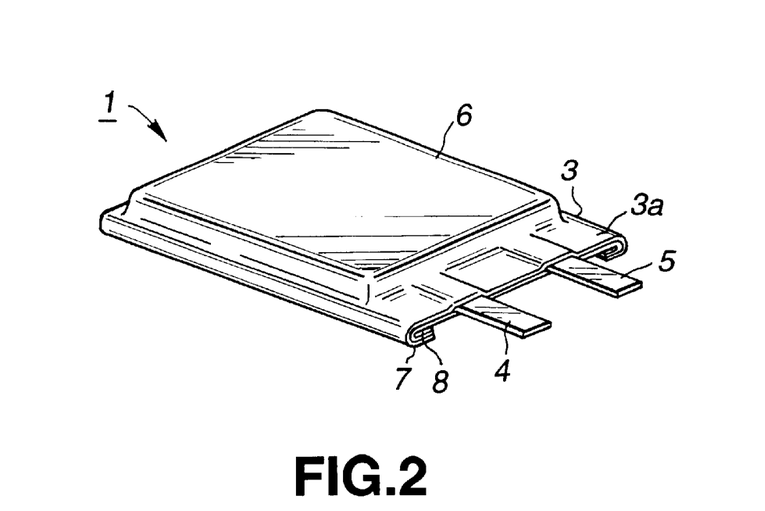
FIG. 2 is a perspective view of a non-aqueous electrolyte cell.

A non-aqueous electrolyte cell 1 is, for example, a solid electrolyte cell, or a gel-like electrolyte cell, and is composed of a unit cell 2, comprised of a solid electrolyte or a gel-like electrode, arranged between the layers of the active materials of the positive and negative electrodes, and an exterior packaging material 3, comprised of a sheet-like laminated film folded back on itself, as shown in FIGS. 1 and 2.

The unit cell 2 has a negative terminal lead 4 and a positive terminal lead 5, electrically connected to a negative electrode and a positive electrode of the unit cell 2, respectively. The negative terminal lead 4 and the positive terminal lead 5 are drawn out to outside the exterior packaging material 3.

The high molecular material used as the high-molecular solid electrolyte for the unit cell 2 may be enumerated by silicon gel, acrylic gel, acrylonitrile gel, polyphosphasen modified polymer, polyethylene oxide, polypropylene oxide, and compound, cross-linked or modified polymers thereof, fluorine-based polymers, such as poly (vinylidene fluoride), poly (vinylidene fluoride-co-hexafluoro propylene), poly (vinylidene fluoride-co-trifluoro ethylene), and mixtures thereof, only by way of examples.

The solid electrolyte or the gel-like electrolyte, layered on the layer of the active material for the positive electrode or on the active material for the negative electrode, is obtained on impregnating the layer of the active material for the positive electrode or the active material for the negative electrode with a solution composed of a high molecular compound, an electrolyte salt and a solvent (with a plasticizer in the case of the gel-like electrode), removing the solvent and solidifying the resulting mass. The solid electrolyte or the gel-like electrolyte, layered on the layer of the active material for the positive electrode or on the active material for the negative electrode, has its portion solidified by being impregnated in the active material for the positive electrode or the active material for the negative electrode. If the high molecular material of the unit cell 2 is cross-linked, it is subsequently solidified on being cross-linked with light or heat.

The gel-like electrolyte is composed of a lithium salt containing plasticizer and not less than 2 wt % to 30 wt % or less of a matrix high molecular material. It is noted that esters, ethers or carbonic acid esters may be used alone or as an ingredient of the plasticizer.

As the matrix high molecular material, used for gelating these carbonic acid esters in preparing the gel-like electrolyte, a variety of high molecular materials used for constituting the gel-like electrolyte may be used. In view of reduction/oxidation stability, it is desirable to use a fluorine-based high molecular material, such as, for example, poly (vinylidene fluoride) or poly (vinylidene fluoride-co-hexafluoro propylene).

The high molecular solid electrolyte is composed of a lithium salt and a high molecular compound for dissolving the lithium salt. As the a high molecular compound, ether-based high molecular compounds, such as poly(ethylene oxide) or cross-linked compounds thereof, poly (methacrylate) esters, acrylates, or fluorine-based high molecular compounds, such as poly(vinylidene fluoride) or poly(vinylidene-co-hexafluoro propylene), may be used alone or as a mixture. In view of stability in oxidation/reduction, fluorine-based high molecular compounds, such as poly(vinylidene fluoride) or poly(vinylidene-co-hexafluoro propylene), may preferably be used.

As the lithium salts to be contained in the gel-like electrolyte or high-molecular solid electrolyte, those used in a routine cell electrolytic solution may be used. Only by way of examples, the lithium compounds (salts) may be enumerated by lithium chloride, lithium bromide, lithium iodide, lithium chlorate, lithium perchlorate, lithium bromate, lithium iodate, lithium nitrate, tetrafluoro lithium borate, hexafluoro lithium phosphate, lithium acetate, bis (trifluoromethane sulfonyl) imido lithium, $LiAsF_6$, $LiCF_3SO_3$, $LiC(SO_2CF_3)_3$, $LiAlCl_4$ and $LiSiF_6$.

These lithium compounds may be used alone or in combination. Of these, $LiPF_6$ and $LiBF_4$ are desirable in view of oxidation stability.

The concentration of lithium salts is 0.1 to 3.0 mol per liter and preferably 0.5 to 2.0 mol per liter of the plasticizer.

The unit cell 2 of the non-aqueous electrolyte cell 1 according to an embodiment of the present invention may be constructed in the same way as in a conventional lithium ion cell except using the above-described gel-like electrolyte or solid electrolyte.

That is a, such a material that is able to dope/undope lithium can be used as a negative electrode material of a lithium ion cell. The constituent material for the negative electrode, such as a carbon material, for example, a difficultly graphizable carbonaceous material or graphite material, may be used. More specifically, carbon materials, including pyrocarbon, cokes (pitch cokes, needle cokes or petroleum cokes), graphite, vitreous carbons, sintered organic high molecular compounds (phenolic resins or furane resins, fired and carbonified at a moderate temperature), carbon fibers, and activated charcoal, may be used. Other materials that can dope/undope lithium include high molecular compounds, such as polyacetylene or polypyrrole, or oxides, such as $SnO_2$, may be used. In preparing a negative electrode, known types of binders may be added, if desired.

The positive electrode may be constructed, using high molecular compounds, such as metal oxides, metal sulfides or specified high molecular materials, as the active material for the positive electrode, depending on the type of the cell to be prepared. If, for example, a lithium ion cell is to be prepared, lithium-free metal sulfides or oxides, such as $TiS_2$, $MoS_2$, $NbSe_2$ or $V_2O_5$, or compound oxides of lithium, mainly composed of $LiMO_2$, where M denotes at least one of transition metals and x is usually 0.05 to 1.10 depending on the charging/discharging state of the cell, may be used as the active material for the positive electrode. The transition metal M of the compound oxide of lithium is preferably Co, Ni or Mn. Specified examples of the compound oxide of lithium include $LiCoO_2$, $LiNiO_2$, $LiNi_yCo_{1-y}O_2$, where $0<y<1$, or $LiMn_2O_4$. The compound oxide of lithium is able to develop a high voltage and serves as an active material for the positive electrode having a superior energy density. Plural sorts of the active material for the positive electrode may be used for the positive electrode. In preparing a positive electrode, known types of electrically conductive materials or binders may be added, if desired.

The structure of the unit cell 2 in the non-aqueous electrolyte cell 1 may be optionally selected from the layering type, take-up type or the collapsing type. If the shape of a spacing 6, formed in the exterior packaging material 3 and in which the unit cell 2 is to be housed, as later explained, is taken into account, the take-up type unit cell 2, having an arcuate lateral side, is desirable.

The exterior packaging material 3 is formed by a heat-sealing type sheet-like laminated film, comprised of three layers, namely an exterior protective layer, an aluminum layer and a heat fused layer (innermost laminate layer). The heat-fused layer is used for sealing the unit cell 2 by thermal fusion, and is formed by a plastic film. The plastic film may be any suitable thermoplastic synthetic material, such as, for example, polyethylene, polypropylene or polyethylene terephthalate.

The exterior packaging material 3 is formed at the outset with the spacing 6, the depth of which is sized to be equal to the thickness of the unit cell 2. The exterior packaging material 3 is folded on itself along a line near a side of the spacing 6. The exterior packaging material 3, thus folded back on itself, is comprised of a housing surface 3a, formed at a mid portion thereof with the spacing 6 by deep drawing, and a bottom surface 3b arranged facing the housing surface 3a and which is adapted to close the spacing 6 in which to accommodate the unit cell 2.

The exterior packaging material 3 is hermetically sealed by heat fusion with heat-fusion margins of a pre-set width along a side parallel to the folding line and along two sides perpendicular to the folding line. That is, in the exterior packaging material 3, the three sides of the exterior packaging material 3, with the exclusion of the folding side, represent heat fusion areas of pre-set widths by which the housing surface 3a and the bottom surface 3b are connected to each other.

Referring to FIG. 2, a negative electrode terminal lead 4 and a positive electrode terminal lead 5 are lead out to outside from the side of the heat-fusion area of the housing surface 3a and the bottom surface 3b parallel to the folding side. Also, both lateral sides 7 of the heat fusion areas of the two sides of the non-aqueous electrolyte cell 1 perpendicular to the folding side are folded back on the bottom surface 3b and immobilized there. In the non-aqueous electrolyte cell 1, since the heat-fused lateral sides 7 are folded on the bottom surface 3b, the area of projection of the cell in the electronic equipment and hence the size of the electronic equipment can be reduced. Also, in the non-aqueous electrolyte cell 1, since the lateral sides 7, heat-fusing the housing surface 3a and the bottom surface 3b together, are folded back on the bottom surface 3b, the cell can be improved in waterproofness in comparison with the conventional cell.

The lateral sides 7 can be folded to a substantially vee-shaped cross-section. If the folding of the lateral sides 7 in the substantially vee cross-sectional shape tends to damage the exterior packaging material 3 of the non-aqueous electrolyte cell 1, in view of the type of the material of the exterior packaging material 3, the lateral sides 7 may be folded with a certain curvature R to prevent damages to the folded portions.

In the non-aqueous electrolyte cell 1, the lateral sides 7, folded on the bottom surface 3b of the exterior packaging material 3 as described above, are secured together using, for example, a double-sided tape 8. This double-sided tape 8 is made up only of an adhesive layer approximately 50 µm in thickness, devoid of a substrate, with the acrylic adhesive being used as this adhesive layer. In the non-aqueous electrolyte cell 1, since the thickness of the double-sided tape 8 used for immobilizing the lateral sides 7 folded back on the bottom surface 3b directly adds to the thickness of the non-aqueous electrolyte cell 1 itself, it becomes difficult to reduce the size of the cell if the thickness of the double-sided tape 8 exceeds 50 µm.

In the non-aqueous electrolyte cell 1, the lateral sides may be immobilized to the bottom surface 3b of the exterior packaging material 3 using an adhesive, such a SuperX manufactured by Cemedine Inc. with a coating thickness of approximately 50 µm, in place of using the double-sided tape.

The non-aqueous electrolyte cell 1, constructed as described above, may be prepared by the following method.
Preparation of the Unit Cell 2

First, a negative electrode was prepared as follows:
A negative electrode mixture was prepared by mixing 90 pars by weight of graphite powders and 10 parts by weight of poly (vinylidene fluoride-co-hexafluoro propylene), as a binder. The resulting mass was dispersed in N-methyl-2-pyrrolidone to form a slurry which then was coated uniformly on one side of a strip-shaped copper foil, 10 µm in thickness, as a negative electrode current collector, and dried. The resulting mass was compression-molded in a roll press to form a negative electrode.

On the other hand, a positive electrode was prepared as follows:
For obtaining a active material for the positive electrode (LiCoO$_2$), lithium carbonate and cobalt carbonate were mixed at a molar ratio of 5 to 1 and fired in air at 900° C. for five hours. 91 parts by weight of the produced LiCoO$_2$, 6 parts by weight of graphite, as an electrically conductivity affording agent, and 10 parts by weight of poly(vinylidene fluoride-co-hexafluoro propylene) were mixed together to prepare a positive electrode mixture, which then was dispersed in N-methyl-2-pyrrolidone to form a slurry. This slurry was uniformly coated on a side of a strip-shaped aluminum foil, 20 µm in thickness, as a positive electrode current collector, and dried. The resulting mass was compression-molded in a roll press to form a positive electrode.

The gel-like electrolyte was also prepared as follows:
On the negative and positive electrodes, a solution obtained on mixing and dissolving 30 parts by weight of a plasticizer, made up of 42.5 parts by weight of ethylene carbonate (EC), 42.5 parts by weight of propylene carbonate (PC) and 16 parts by weight of LiPF$_6$, 10 parts by weight of poly (vinylidene fluoride-co-hexafluoro propylene), with a weight average molecular weight of 600,000 and 60 parts by weight of diethyl carbonate, was coated evenly, impregnated and allowed to stand at ambient temperature for eight hours to vaporize dimethyl carbonate off to yield a gel-like electrolyte.

The negative and positive electrodes, coated with the gel-like electrolyte, were placed with the sides of the gel-like electrolyte facing each other and press-bonded together to form a flat-plate type gel-like electrolyte cell with an area of 2.5 cm by 4.0 cm and a thickness of 0.3 mm.

A positive electrode terminal lead of aluminum and a negative electrode terminal lead of nickel were welded to portions of the electrode plates not coated with the active material, which are an aluminum foil and a copper foil on the positive and negative electrodes, respectively, to prepare a unit cell 2.

Figure 3A:
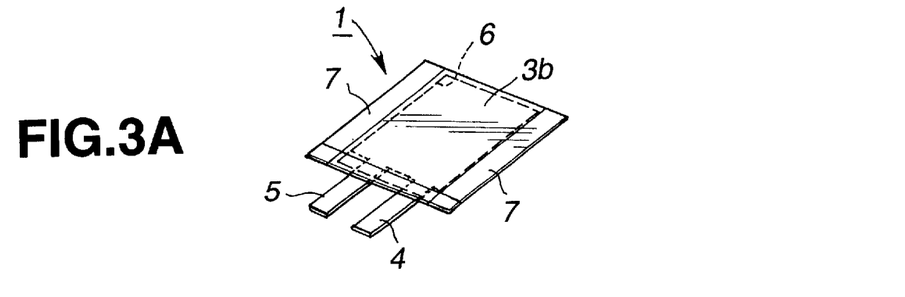
FIGS. 3a to 3d are perspective views, looking from the bottom side, for illustrating the state of collapsing of side portions of the exterior packaging material for the non-aqueous electrolyte cell.
Figure 3B:
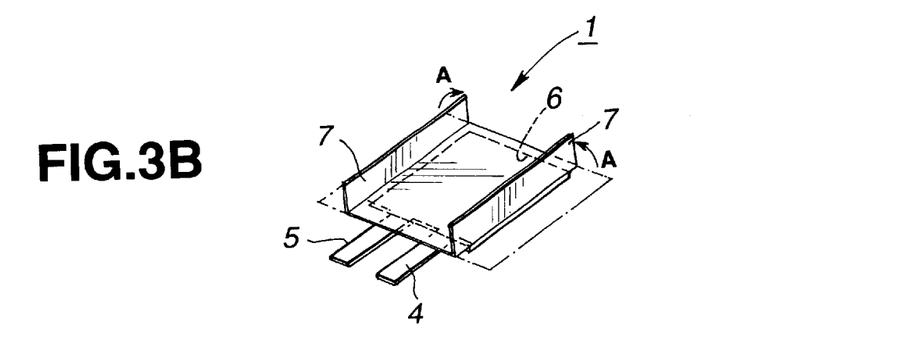

The unit cell 2 then is accommodated in the spacing 6 formed by deep drawing on the housing surface 3a of the exterior packaging material 3. The exterior packaging material 3 then is folded back on itself so that the bottom surface 3b faces the housing surface 3a to close the spacing 6. The housing surface 3a and the bottom surface 3b then are fused together at three sides except the folding side, around the spacing 6, to hermetically seal the exterior packaging material 3. Any redundant portions of the exterior packaging material 3 outside a heat-sealed portion 3c are cut off for trimming The non-aqueous electrolyte cell 1, trimmed by cutting off the redundant material, shown in FIG. 3a, has its lateral sides 7 bent in the direction indicated by arrow A in FIG. 3b.

Figure 4:
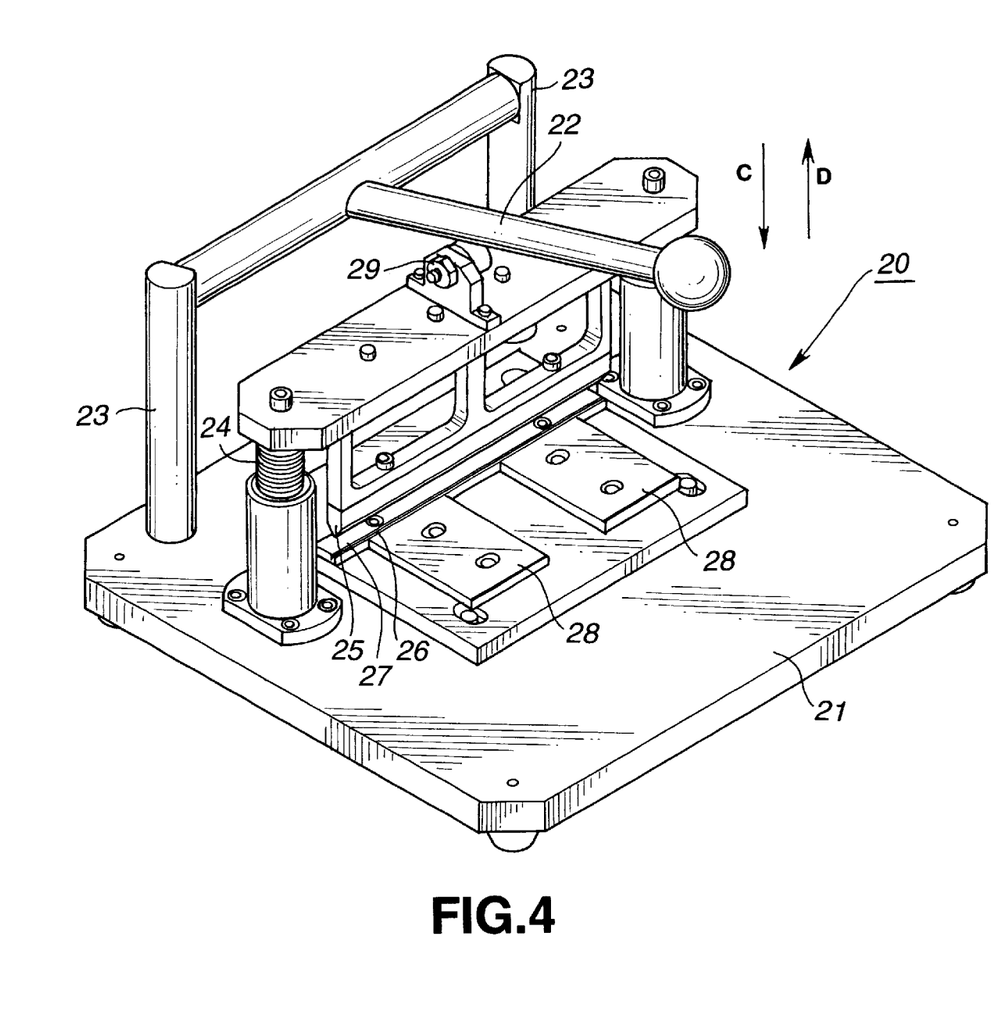
FIG. 4 is a perspective view showing a folding jig.
Figures 5A, 5B:
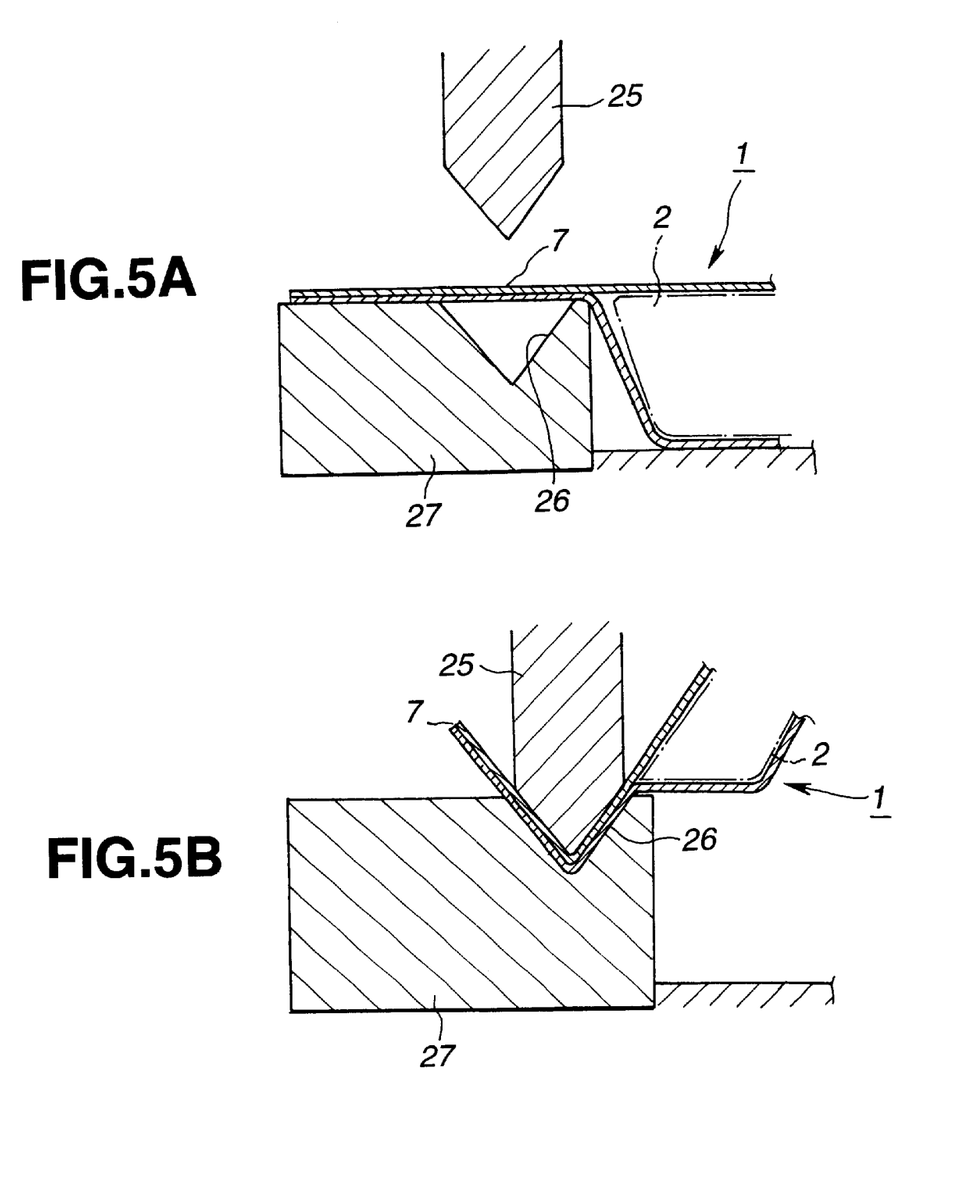
FIGS. 5a and 5b are enlarged cross-sectional views showing essential portions of the folding jig on which the non-aqueous electrolyte cell is set.

The lateral sides 7 are bent by a bending jug 20 shown in FIG. 4.

The bending jig 20 is made up of a stand 23, rotationally supporting a T-shaped lever 22 on a base block 21, a blade 25 biased by a coil spring 24 in the direction indicated by arrow D in FIG. 4 and which is arranged for performing lifting and lowering movements in the direction indicated by arrows C and D in FIG. 4 a vee-grooved block 27 formed with a vee groove 26 directly below the blade 25 and a guide plate 28 arranged adjacent to the vee-grooved block 27 and which is adapted for guiding the setting position of the non-aqueous electrolyte cell 1.

When the lever 22 is thrust in the direction indicated by arrow C in FIG. 4, the blade 25 provided on the bending jig 20 is thrust downwards via a cam follower 29 arranged on the blade 25 so as to descend in the direction indicated by arrow C in FIG. 4C. When the blade 25 is lowered, the distal end of the blade 25 fits in the groove 26 formed in the vee-grooved block 27 directly below the blade 25. The distal end of the blade 25 is formed to a substantially triangular cross-sectional shape having two sides of a letter V in meeting with the shape of the groove 26.

The bending of the lateral sides 7 by the bending jig 20, constructed as described above, is hereinafter explained.

First, the non-aqueous electrolyte cell 1 is set with position matching by the guide plate 28 and the vee-grooved block 27 on the bending jig 20. At this time, the non-aqueous electrolyte cell 1 is set so that its one lateral side 7 will be positioned above the groove 26 of the vee-grooved block 27.

The lever 22 then is thrust downwards in the direction indicated by arrow C in FIG. 4 until the blade 25 is brought to a stop. The blade 25, thus lowered, is contacted with the lateral side 7 of the non-aqueous electrolyte cell 1, arranged over the groove 26, thus thrusting the lateral side into the groove 26. When the lateral side 7 is thrust into the inside of the groove 26 by the blade 25, the non-aqueous electrolyte cell 1 is bent into a substantially vee shape.

The opposite lateral side 7 is similarly bent, using the bending jig 20, so that the non-aqueous electrolyte cell 1 is bent to substantially the U-shape. When both lateral sides are bent, the non-aqueous electrolyte cell 1 is dismounted from the bending jig 20.

The lateral sides 7 may be bent to a desired angle by changing the shape of the groove 26 and the blade 25. In the preferred embodiment, the lateral sides 7 are bent to substantially a vee shape by the groove 25 and the blade 26. Alternatively, the lateral sides 7 may be bent to a radius of curvature R provided in the lateral side 7. The bending jig 20 has a groove having a radius R in the lateral side 7 and a blade having its distal end formed to have a radius of curvature R in meeting with the groove shape.

Figure 3C:
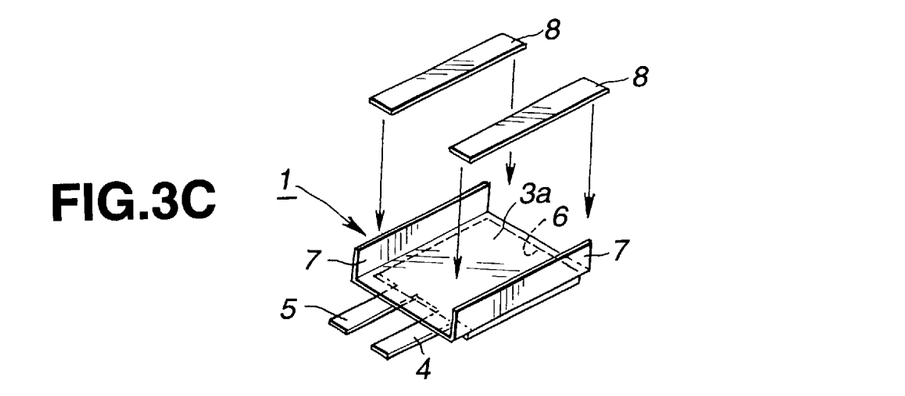
Figure 3D:
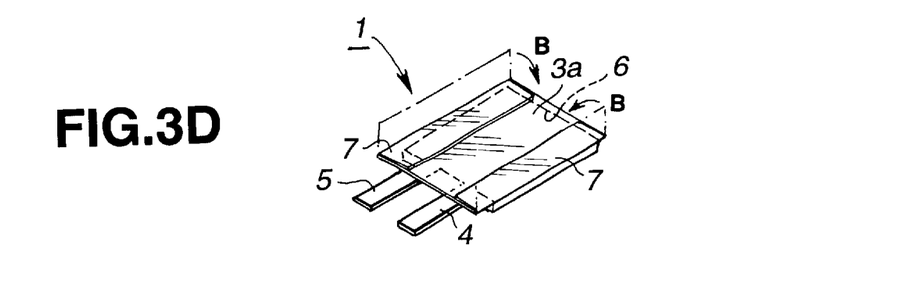

Then, two double-sided tapes 8 are bonded to the lateral sides 7 of the bottom surface 3b of the non-aqueous electrolyte cell 1, as shown in FIG. 3c.

With the double-sided tapes 8 bonded to the bottom surface 3b of the exterior packaging material 3, the lateral sides 7 are folded and immobilized on the bottom side 3b of the exterior packaging material 3.

Figure 6:
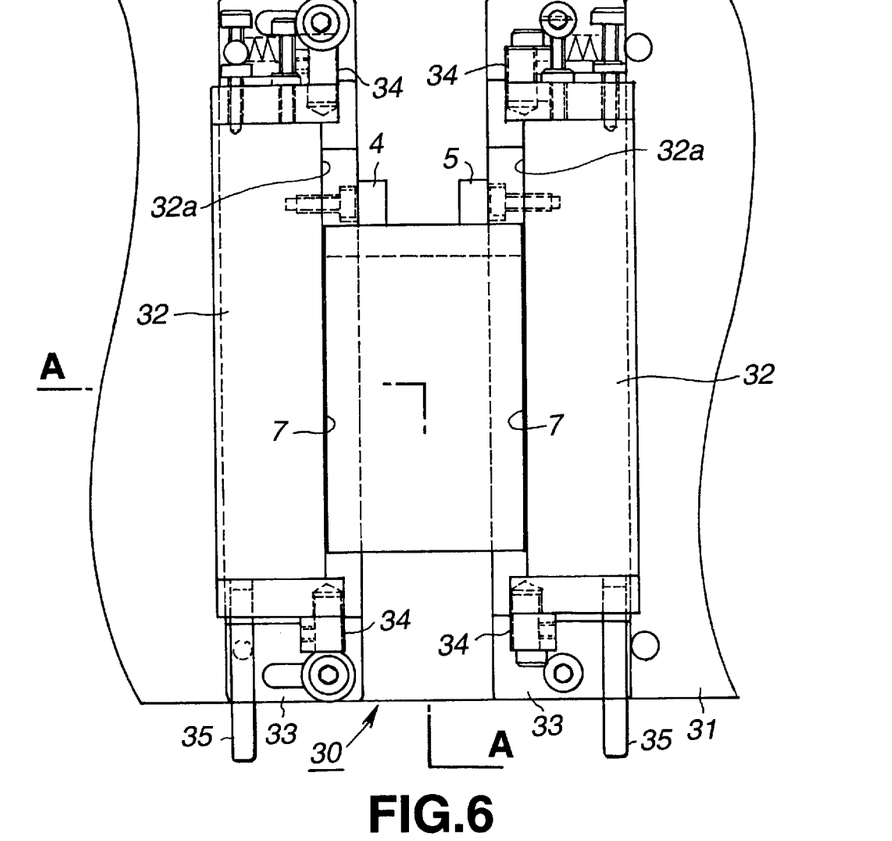
FIG. 6 is a plan view of an immobilizing jig on which the non-aqueous electrolyte cell is set.

The lateral sides 7 is immobilized using an immobilizing jig 30 shown in FIG. 6.

Figure 7:
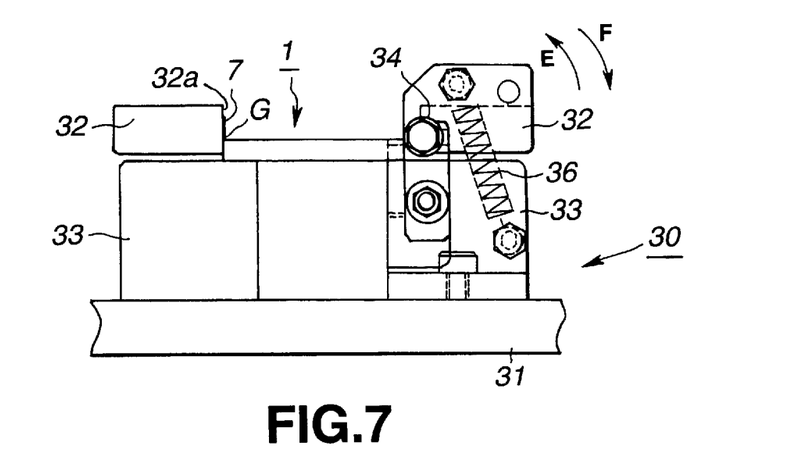
FIG. 7 is a cross-sectional view of the immobilizing jig taken along line A—A in FIG. 6.

The immobilizing jig 30 includes a pair of folding blocks 32, rotationally mounted on a base block 31, and a pair of supporting blocks 33 supporting the folding blocks 32, as shown in FIGS. 6 and 7.

The folding blocks 32 are rotationally supported for rotation in the directions indicated by arrows E and F in FIG. 7 by paired supporting shafts 34 arranged on longitudinal ends of the folding blocks 32. The immobilizing jig 30 opens or closes the gap between the folding blocks 32 by an operator holding the knobs 35 for rotating the centers of the supporting shafts 34 in the directions indicated by arrows E and F in FIG. 7. Meanwhile, the immobilizing jig 30 is biased by the coil spring 36 in the direction indicated by arrow F in FIG. 7.

The manner in which the lateral sides 7 are immobilized on the bottom surface 3b by the above-described immobilizing jig 30 is hereinafter explained.

Figures 8A, 8B:
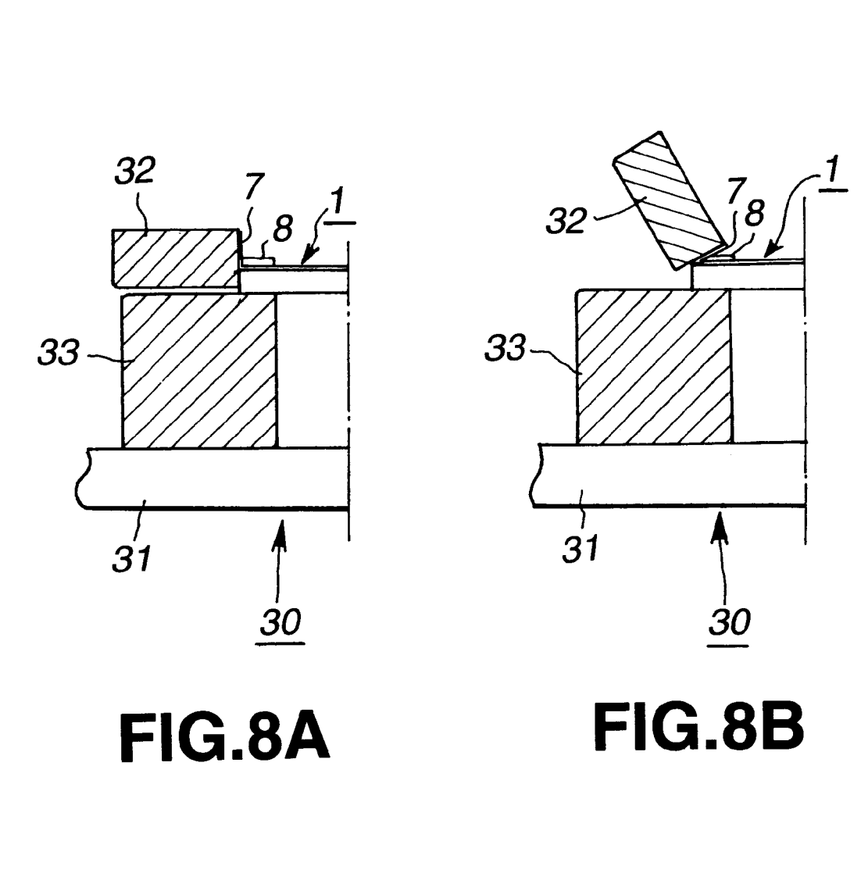
FIGS. 8a to 8c are enlarged cross-sectional views showing essential portions of the immobilizing jig on which the non-aqueous electrolyte cell is set.

On the supporting blocks 33, disposed below the folding blocks 32 of the immobilizing jig 30, the non-aqueous electrolyte cell 1 is set. At this time, the non-aqueous electrolyte cell 1 is set so that the lateral side 7 bent by the bending jig 20 lies for extending along vertically extending side 32a of the bending block 32, as shown in FIG. 8a.

The operator then rotates the knob 35 provided on the folding block 32 in the direction indicated by arrow E in FIG. 7 to close the folding block 32. At this time, the immobilizing jig 30 is set so that the vicinity of the proximal end of the lateral side 7 of the non-aqueous electrolyte cell 1 is at the center of rotation G of the folding block 32, as shown in FIG. 8b. On rotation of the folding block 32, the lateral side 7, set for extending along the vertically extending side 32a of the bending block 32, is folded on the bottom surface 3b under the thrust exerted by the folding block 32.

Figure 8C:
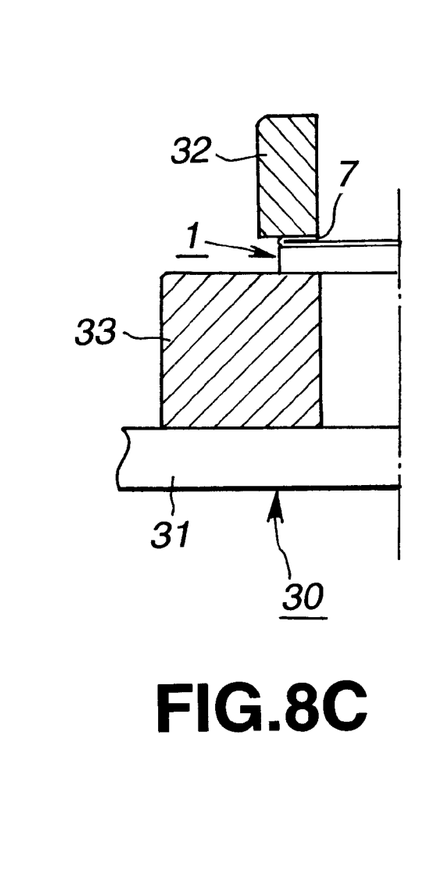

The folding block 32 is rotated until the lateral side 7 is contacted with the double-sided tape 8 bonded on the bottom surface 3b, as shown in FIG. 8c. By the lateral side 7 being thrust by the double-sided tape 8, the lateral side 7 and the bottom surface 3b of the non-aqueous electrolyte cell 1 are immobilized by being bonded to the double-sided tape 8.

The folding block 32 is then restored to its original position by the coil spring 36 biasing the folding block 32 in the direction indicated by arrow F in FIG. 7. The non-aqueous electrolyte cell 1, having the lateral side 7 folded on the bottom surface 3b and there immobilized, is taken out from a space between the two folding blocks 32.

The bending jig 20 and the immobilizing jig 30 may be modified as to the guide plate 28, vee-grooved block 27 or the distance between the folding blocks 32 depending on the size of the non-aqueous electrolyte cell 1 for application to a variety of sizes of the non-aqueous electrolyte cells.

What is claimed is:

1. A non-aqueous electrolyte cell comprising:
   a package comprising a housing layer having a relatively depressed portion, a bottom layer configured to cover an opening of said depressed portion, a folded edge joining said housing layer and said bottom layer, a free edge opposite said folded edge, and at least one lateral edge extending from said folded edge, wherein said free edge and said at least one lateral edge define a common periphery;
   a unit cell housed in said depressed portion of said package;
   electrode terminal leads electrically connected to respective electrodes of said unit cell wherein said electrode terminal leads extend out of said free edge of said package; and
   a heat-fused portion on said common periphery of said package;
   wherein said heat-fused portion of said at least one lateral edge of said common periphery is folded back on said at least one lateral edge to form a folded portion.

2. The non-aqueous electrolyte cell according to claim 1 wherein said depressed portion is formed by deep drawing.

3. The non-aqueous electrolyte cell according to claim 1 wherein the heat-fused portion of said at least one lateral edge of said common periphery is folded toward the bottom layer of the package.

4. The non-aqueous electrolyte cell according to claim 1 wherein the folded portion of said at least one lateral edge is immobilized by an adhesive transfer tape.

5. The non-aqueous electrolyte cell according to claim 4 wherein said adhesive transfer tape includes an acrylic adhesive layer.

6. A package for housing a unit cell, comprising:
   a housing layer having a relatively depressed portion;
   a bottom layer configured to cover an opening of said depressed portion;
   a folded edge joining said housing layer and said bottom layer;
   a free edge opposite said folded edge; and
   at least one lateral edge extending from said folded edge, wherein said free edge and said at least one lateral edge define a common periphery;

wherein said package is heat fused around said common periphery to form a heat fused portion; and wherein said heat-fused portion of said at least one lateral edge of said common periphery is folded back on said at least one lateral edge to form a folded portion.

7. The package for housing a unit cell according to claim 6, wherein said heat fused portion of said at least one lateral edge of said common periphery is folded toward the bottom layer of the package.

8. The package for housing a unit cell according to claim 6, wherein said folded portion of said at least one lateral edge is immobilized by an adhesive transfer tape.

9. The package for housing a unit cell according to claim 8, wherein said adhesive transfer tape has an acrylic adhesive tape.

10. The package for housing a unit cell according to claim 6 wherein said depressed portion is formed by deep drawing.

* * * * *

UNITED STATES PATENT AND TRADEMARK OFFICE
CERTIFICATE OF CORRECTION

PATENT NO.    : 6,358,644 B1
DATED         : March 19, 2002
INVENTOR(S)   : Keiichi Shibata, Kyoko Obata and Kazuhito Hatsuta It is certified that error appears in the above-identified patent and that said Letters Patent is hereby corrected as shown below:

<u>Title page,</u>
Item [54], delete "ELECTOLYTE" and replace with -- ELECTROLYTE --

Signed and Sealed this

Twenty-eighth Day of May, 2002

Attest:

JAMES E. ROGAN
Attesting Officer    Director of the United States Patent and Trademark Office